United States Patent
Nelsen et al.

[11] Patent Number: 5,862,320
[45] Date of Patent: *Jan. 19, 1999

[54] SDRAM DIMM PRESENCE DETECT INTERFACE

[75] Inventors: Pete Edward Nelsen; Douglas Michael Berk, both of Plano, Tex.; Kenneth Ma, Cupertino, Calif.

[73] Assignee: Cirrus Logic, Inc., Fremont, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 577,579

[22] Filed: Dec. 22, 1995

[51] Int. Cl.⁶ .................................................. G06F 11/00
[52] U.S. Cl. ................... 395/183.18; 395/284; 395/836; 395/833
[58] Field of Search ................... 395/183.12, 497.01, 395/800, 284, 497.02, 492.03, 828, 183.18, 182.03, 830, 832, 833, 836, 838, 837; 711/170, 171, 172

[56] References Cited

U.S. PATENT DOCUMENTS

| | | | |
|---|---|---|---|
| 4,330,825 | 5/1982 | Girard | 395/284 |
| 4,470,038 | 9/1984 | Amano et al. | 340/365 S |
| 5,210,698 | 5/1993 | Topmiller | 364/476 |
| 5,253,357 | 10/1993 | Allen et al. | 395/425 |
| 5,287,531 | 2/1994 | Rogers, Jr. et al. | 395/800 |
| 5,375,084 | 12/1994 | Begun et al. | 365/63 |
| 5,390,327 | 2/1995 | Lubbers et al. | 395/182.05 |
| 5,446,860 | 8/1995 | Dresser et al. | 395/427 |
| 5,509,138 | 4/1996 | Cash et al. | 395/497.01 |
| 5,513,135 | 4/1996 | Dell et al. | 365/52 |
| 5,524,232 | 6/1996 | Hajeer | 395/442 |
| 5,539,912 | 7/1996 | Clarke, Jr. et al. | 395/800 |
| 5,598,540 | 1/1997 | Krueger | 395/284 |
| 5,606,662 | 2/1997 | Wisor | 395/185.01 |
| 5,613,135 | 3/1997 | Sakai et al. | 395/800 |

*Primary Examiner*—Joseph Palys
*Attorney, Agent, or Firm*—David H. Tannenbaum; Steven A. Shaw

[57] ABSTRACT

A keyboard controller is used to drive the PDEN pins on DIMMs. A PC has a keyboard controller with a plurality of programmable input/output (I/O) pins. The state of the programmable I/O pins can be set by software. The pins are coupled to individual PDEN pins on the DIMMs. When the programmable I/O pins are activated, the PDEN pins are driven active and each DIMM outputs a signal indicating its characteristics. The signals are latched and stored for use by a memory controller.

24 Claims, 1 Drawing Sheet

SDRAM DIMM PRESENCE DETECT INTERFACE

RELATED APPLICATIONS

This application is related to Ser. No. 08/577,584, now U.S. Pat. No. 5,802,581, SDRAM MEMORY CONTROLLER WITH MULTIPLE ARBITRATION POINTS, Ser. No. 08/579,068, now U.S. Pat. No. 5,802,597, SDRAM MEMORY CONTROLLER SUPPORTING SINGLE DATA ACCESSES, and Ser. No. 08/577,351, now U.S. Pat. No. 5,740,383, DYNAMIC ARBITRATION PRIORITY, filed concurrently with this application and hereby incorporated by reference herein. These applications are commonly assigned.

TECHNICAL FIELD OF THE INVENTION

This invention pertains in general to computer systems and more particularly to computer systems having synchronous dynamic random access memories.

BACKGROUND OF THE INVENTION

Most computer systems (PCs) have a motherboard with a plurality of memory slots. A dynamic random access memory (DRAM), usually in the form of a single inline memory module (SIMM), can be placed into each slot to increase the memory capacity of the PC.

For example, a typical PC has four memory slots on the motherboard. Assume that each slot is filled with an 8-megabyte SIMM. Thus, the PC has a total of 32 megabytes of main memory. Alternatively, the slots could be filled with 16-megabyte SIMMs, for a total of 64 megabytes of main memory.

When turned on, a PC performs a power on self test (POST) controlled by its basic input/output system (BIOS). By performing this test, the PC can determine certain characteristics of its installed SIMMS, such as memory density. In addition, the PC tests the memory on its motherboard by writing data to memory and then reading the data to verify the memory's contents.

Recently, new storage devices called dual inline memory modules (DIMMs) have been developed. DIMMs may use synchronous dynamic random access memory (SDRAM) instead of DRAM. SDRAM, unlike DRAM, has a digital interface that controls the memory. The digital interface receives commands and then internally converts the commands into memory access cycles.

SDRAM must be initialized before it can be accessed. The BIOS, however, cannot determine whether a DIMM contains DRAM or SDRAM using standard detection algorithms. Furthermore, the BIOS cannot perform a blanket SDRAM initialization on system memory because it might violate the timing on a DRAM DIMM. Accordingly, the PC cannot easily determine the characteristics of its installed memory.

To avoid the above-described problem, DIMMs have a presence detect enable (PDEN) pin. When the PDEN pin is activated, the DIMM drives a plurality of presence detect (PD) pins with a hardwired signal indicating the characteristics of the DIMM. This signal can be latched and stored by the PC.

The PD pins, however, are likely to be multiplexed with the memory data bus or other signals in the PC. If the PDEN pin is also multiplexed, then the PDEN pin might drive the PD pins while other data was on the memory data bus. Such a situation would corrupt the data on the memory data bus.

The PC, therefore, must have individual single function pins that activate the PDEN pins on each DIMM. Unfortunately, the number of pins available on a memory or integrated controller is extremely limited by PC design constraints. Therefore, individual single function pins cannot be spared to drive the PDEN pins.

Accordingly, there is a need for a way to determine the characteristics of memory installed in a PC supporting SDRAM DIMMs. More specifically, there is a need for a way to drive a DIMM's PDEN pin without requiring the use of a individual single function pin in the memory controller.

SUMMARY OF THE INVENTION

The above and other needs are met by using a keyboard controller to drive the PDEN pins on each DIMM. A PC has a keyboard controller with a plurality of programmable input/output (I/O) pins. The state of the programmable I/O pins can be set by software. The pins are coupled to the individual PDEN pins on the DIMMs. When the programmable I/O pins are activated, the PDEN pins are driven active and each DIMM outputs a signal indicating its characteristics. The signals are latched and stored for use by a memory controller.

A technical advantage of the present invention is that the characteristics of the installed DIMMs can be determined.

Another technical advantage is that the characteristics of the DIMMs can be determined without using individual single purpose pins on the memory controller to drive the PDEN pins.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
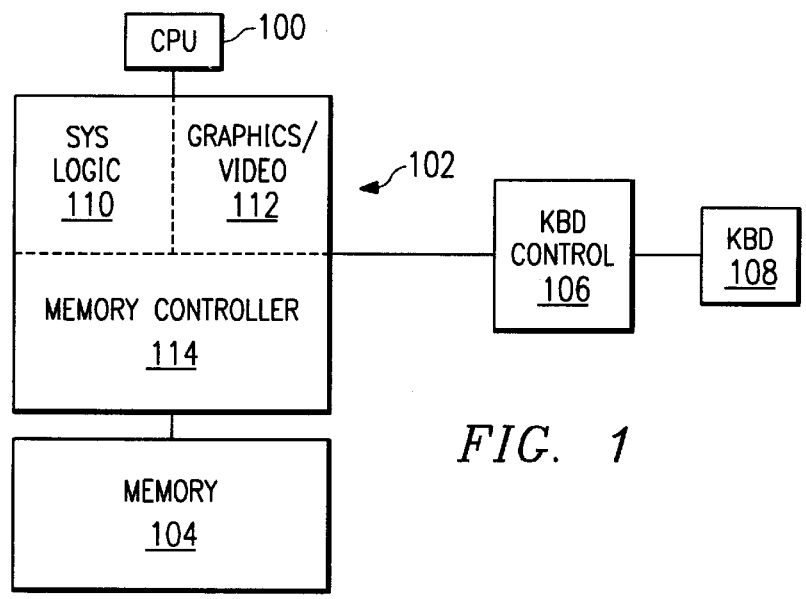
FIG. 1 illustrates a high-level functional block diagram of a computer system having a unified memory architecture.

FIG. 1 illustrates a high-level functional block diagram of a computer system (PC) having a unified memory architecture (UMA). Shown are central processing unit (CPU) 100 coupled to integrated controller 102. Integrated controller 102, in turn, is coupled to memory 104. Keyboard controller 106 is coupled to integrated controller 102 and keyboard 108 is coupled to keyboard controller 106.

CPU 100 is preferably an X86 compatible CPU. However, the present invention will work equally well with any standard CPU. Integrated logic 102 contains system logic 110, graphics/video controller (hereafter referred to as "graphics controller") 112, and memory controller 114.

System logic 110 contains the logic necessary to control the operation of the computer system, such as the bus logic. Graphics controller 112 controls the generation of graphics data on a display screen (not shown). Graphics controller 112 may receive video data from a real-time video source separate from the computer system or display graphics data received from CPU 100. Memory controller 114 communicates memory access requests with memory 104.

Keyboard controller 106 is a standard keyboard controller as is well known in the art. Keyboard controller 106 has a plurality of programmable input/output (I/O) pins (not shown in FIG. 1). The state of each pin can be set by software executing on the PC. Keyboard 108 is a standard computer keyboard.

Although FIG. 1 shows a computer having a UMA, the present invention works equally well in computer systems having other architectures. For example, the present invention could be used in a computer system having a main memory and a separate video/graphics memory.

Figure 2:
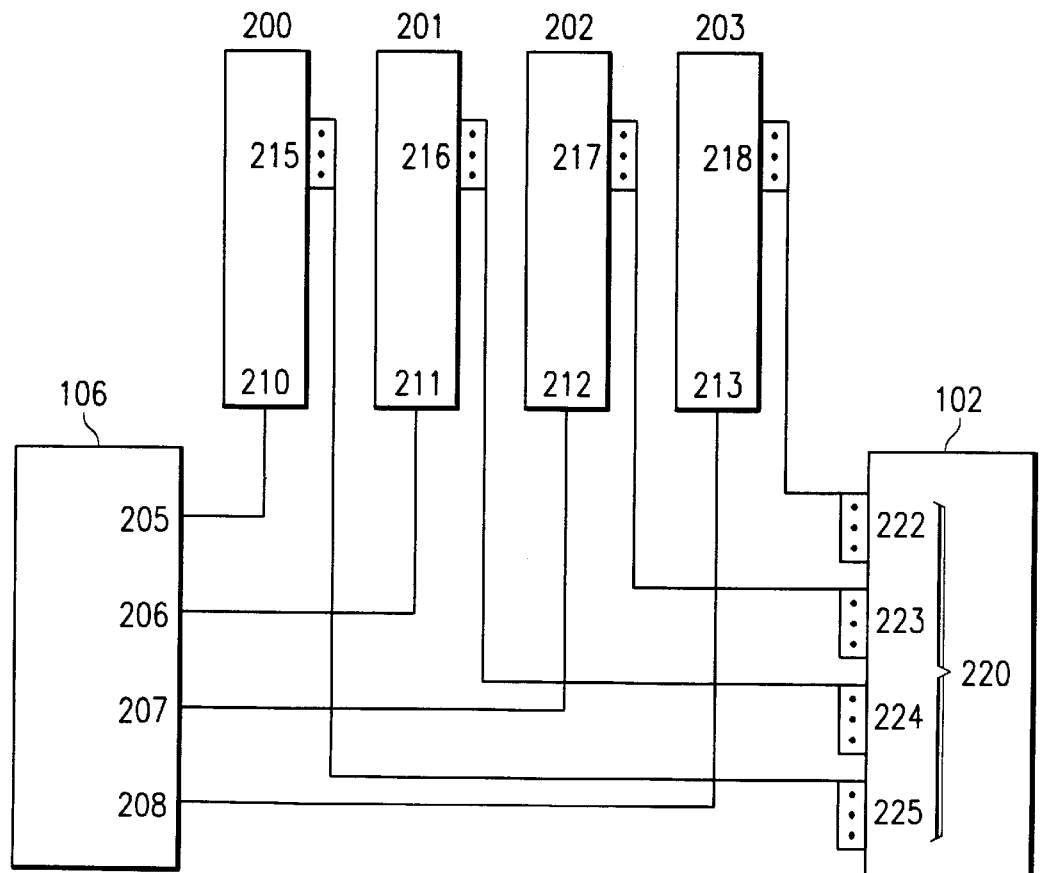
FIG. 2 is a functional block diagram of the operative components of the present invention.

FIG. 2 is a more detailed functional block diagram illustrating keyboard controller 106, DIMMs 200–203, and integrated controller 102. Keyboard controller 106 has four programmable I/O pins 205–208. The state of each pin 205–208 can be set by the basic input/output system (BIOS) or software.

Each DIMM 200–203 is physically constructed as a board having a plurality of memory devices, or chips. Each board contains either SDRAM or dynamic random access memory (DRAM). Each DIMM 200–203 has a single presence detect enable (PDEN) pin 210–213 and nine presence detect pins (PD[9:1]) 215–218. Each PDEN pin 210–213 is coupled to a respective programmable I/O pin 205–208 on the keyboard controller 106. When a programmable I/O pin 205 drives a PDEN pin 210 on a DIMM 200 active, the DIMM 200 drives a presence detect signal on its PD[9:1] pins 215.

The presence detect signal indicates the various characteristics of the DIMM 200–203. These characteristics include the DIMM's density and speed, configuration, and whether the DIMM supports parity. If the DIMM has SDRAM, the characteristics also include the SDRAM device configuration and number of memory banks.

Integrated controller 102 has a plurality of pins 220 on its memory data bus. The pins 220 are grouped into sets 222–225, with each set coupled to the PD[9:1] pins 215–218 of a respective DIMM 200–203. In FIG. 2, therefore, integrated controller 102 has four sets 222–225 of nine pins.

When the PC is powered up, the BIOS activates each of the programmable I/O pins 205–208 on the keyboard controller 106. The programmable I/O pins 205–208, in turn, activate the PDEN pins 210–213 on each DIMM 200–203. In response, each DIMM 200–203 drives its PD[9:1] 215–218 pins with a signal indicating the characteristics of the DIMM. Integrated controller 102 receives the signals on the pins 220 of its data bus. Then, integrated controller 102 latches and stores the signals in the appropriate place to be used by the memory controller 114 when it 114 needs to know about the memory characteristics.

It should be noted that the memory configurations shown in FIGS. 1–2 are for illustrative purposes only. Thus, the number and configuration of the DIMMs (or SIMMs) and pins can vary and still be within the scope of the present invention. In addition, the present invention works with any form of memory that outputs a signal indicating its characteristics in response to an input signal. Thus, the present invention can be used with SDRAM and DRAM DIMMs.

Although the present invention and its advantages have been described in detail, it should be understood that various changes, substitutions and alterations can be made herein without departing from the spirit and scope of the invention as defined by the appended claims.

We claim:

1. A method of determining characteristics of a memory module in a computer system, comprising the steps of:

sending a first signal directly from a programmable input/output pin to a presence detect enable input on a DIMM, wherein the first signal is sent by a keyboard controller; and receiving a second signal from the DIMM, wherein the second signal is generated by the DIMM in response to the first signal, and wherein the second signal is utilized in determining the characteristics of the DIMM.

2. The method of claim 1, wherein the DIMM comprises SDRAM.

3. The method of claim 1, wherein the sending step further comprises the step of:

programming at least one programmable I/O pin on the keyboard controller to send the first signal.

4. The method of claim 1, wherein the receiving step further comprises the step of:

latching and storing the second signal.

5. The method of claim 1, wherein the second signal indicates at least one characteristic of the DIMM.

6. The method of claim 5, wherein the characteristic comprises memory speed.

7. The method of claim 5, wherein the characteristic comprises memory density.

8. The method of claim 5, wherein the characteristic comprises memory configuration.

9. A system for detecting the presence of a memory module in a computer system, comprising:

first means for sending a first signal directly from a programmable input/output pin on a keyboard controller to a presence detect enable input on a DIMM, wherein means within the DIMM generates a second signal in response to the first signal;

second means independent from the first means for receiving the second signal, wherein the detecting the presence of the DIMM is a function of said second signal.

10. The system of claim 9, wherein the second means comprises a memory controller.

11. The system of claim 9, wherein the DIMM comprises a SDRAM.

12. The system of claim 9, wherein the second signal indicates at least one characteristic of the DIMM.

13. The system of claim 12, wherein the characteristic comprises memory speed.

14. The system of claim 12, wherein the characteristic comprises memory density.

15. The system of claim 12, wherein the characteristic comprises memory configuration.

16. A system for detecting characteristics of a memory in a computer system, wherein the memory comprises at least one DIMM having a first input and a plurality of outputs and wherein the at least one DIMM generates an output signal on the plurality of outputs in response to an input signal on the first input, comprising:

a keyboard controller having at least one programmable I/O pin, the at least one programmable I/O pin coupled directly to the first input, wherein said first input is a presence detect enable pin on a DIMM; and a memory controller having a plurality of second inputs coupled to the plurality of outputs.

17. The system of claim 16, wherein the second controller comprises an integrated controller.

18. The system of claim 16, wherein the memory comprises an SDRAM.

19. The system of claim 16, wherein the output signal indicates at least one characteristic of the memory.

20. The system of claim 19, wherein the characteristic comprises memory speed.

21. The system of claim 19, wherein the characteristic comprises memory density.

22. The system of claim 19, wherein the characteristic comprises memory configuration.

23. The method of claim 8, wherein the memory configuration is a number of SDRAM memory banks.

24. The method of claim 8, wherein the memory configuration is parity support.

* * * * *